Dec. 25, 1962 C. C. CARSE ETAL 3,070,254
PRESSURE CONTAINER FOR DISPENSING BEVERAGES
Filed Aug. 21, 1961
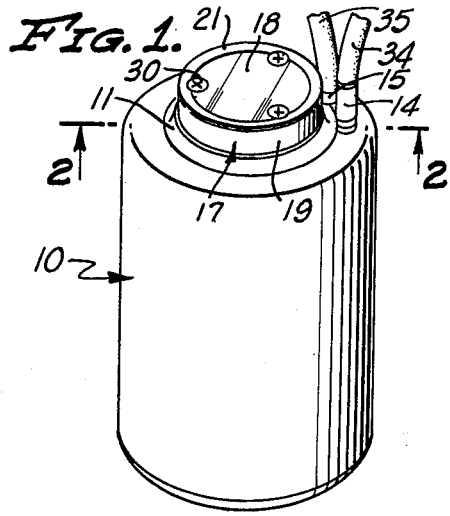
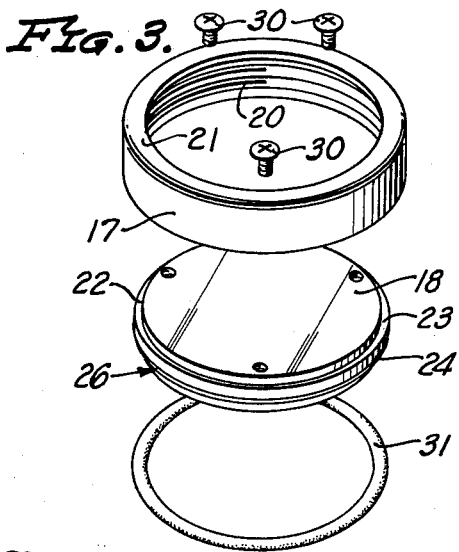
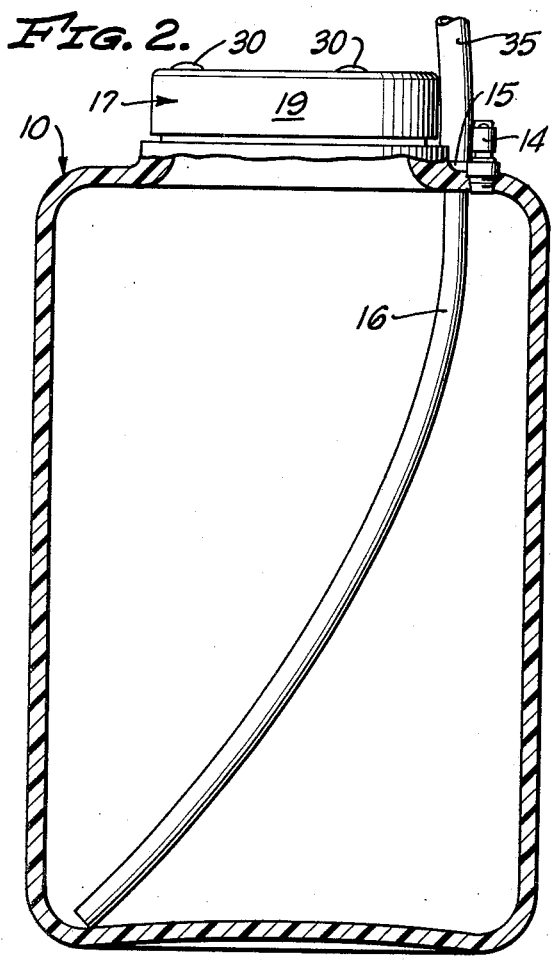
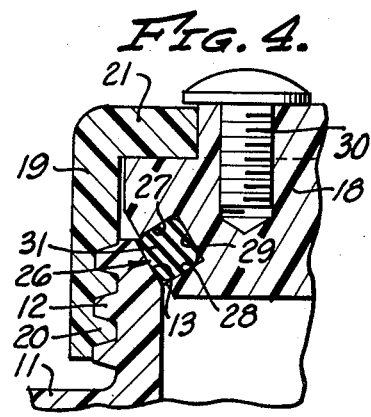
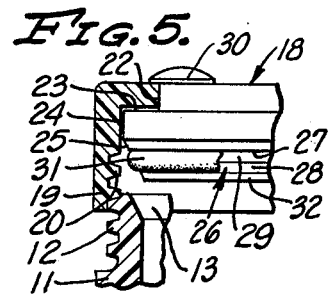
INVENTORS
CLIFFORD C. CARSE,
HENRY E. KREMERS
BY Robert C. Comstock
ATTORNEY

United States Patent Office 3,070,254
Patented Dec. 25, 1962

1

3,070,254
PRESSURE CONTAINER FOR DISPENSING
BEVERAGES
Clifford C. Carse and Henry E. Kremers, Glendale, Calif.,
assignors to Airmold Corporation, Glendale, Calif., a
corporation of California
Filed Aug. 21, 1961, Ser. No. 132,809
6 Claims. (Cl. 220—39)

This invention relates to a pressure container which is particularly designed and adapted for holding flavoring syrups for use in making beverages and in which gas or air pressure is supplied to the container to facilitate removal of the flavoring syrup.

In the past, such containers have customarily been formed of stainless steel because it was the only known material having the necessary qualities and properties.

It is an object of our invention to provide a new and improved container of the type described which is formed of thermoplastic material, preferably a polyolefin type of thermoplastic. Our container, which is molded of such material, is odorless, tasteless and non-corrosive in respect to beverage syrups and/or carbon dioxide gas. One of the principal advantages of our containers over those made of stainless steel is that our container is translucent, so that the syrup level within the container can easily be ascertained by external visual inspection. Since the container is non-staining, it remains translucent at all times.

Another object of our invention is to provide a container of the type decribed which is capable of withstanding and holding the pressures which are used to remove the beverage syrups from the container.

A further object of our invention is to provide a pressure container having a new and improved sealing means which is simple and economical to manufacture and which provides an effective seal at all times. A more particular object of our invention is to provide a pressure container in which the seal is not broken by a slight upward movement of the lid and in which the pressure from within the container which ordinarily would act to unseal the lid acts to improve and increase the seal between the lid and the container.

Our invention also comprises such other objects, advantages and capabilities as will later more fully appear and which are inherently possessed by our invention.

While we have shown in the accompanying drawings a preferred embodiment of our invention, it should be understood that the same is susceptible of modification and change without departing from the spirit of our invention.

Referring to the drawings,

FIG. 1 is a perspective view of our pressure container for dispensing beverages;

FIG. 2 is a side elevational view of the same, mostly in section taken along lines 2—2 of FIG. 1;

FIG. 3 is an exploded perspective view of the parts comprising the lid and sealing assembly;

FIG. 4 is a sectional view of one side of the neck, showing the lid in closed position;

FIG. 5 is a similar view, partly in elevation, showing the lid in open position.

A preferred embodiment which has been selected to illustrate our invention comprises a container 10, which is preferably formed of translucent plastic material such as a polyolefin type of thermoplastic, so that the amount of syrup or other material disposed within the container can be determined by external visual inspection without removal of the container lid.

The container 10 is provided at the top thereof with a neck 11, which carries external screw threading 12. The inside of the upper end of the neck 11 is provided with a wide angularly directed smooth flat sealing band 13. The band 13 preferably extends at an angle of approximately 30° from vertical.

Disposed directly adjacent to the neck 11 on the top of the container 10 are an inlet plug 14 and an outlet plug 15. The inlet plug 14 is adapted to removably receive an inlet hose 34 for supplying carbon dioxide gas or other suitable gaseous material to the container 10 under pressure from a suitable source of supply. The outlet plug 15 is adapted to removably receive an outlet hose 35, through which the contents of the container 10 are removed. A tube 16 is disposed within the container 10, with its upper end connected to the outlet plug 15 and its lower end open and disposed adjacent the bottom of the container 10.

The sealing lid comprises two parts, an outer collar 17 and an inner sealing member 18. The collar 17 is preferably formed of metal and comprises an annular side 19, which carries internal screw threading 20 which is adapted to engage the external screw threading 12 of the neck 11. A top flange 21 extends at a right angle to the side 19.

Mounted within the upper portion of the collar 17 adjacent to the top flange 21 is the sealing member 18. The sealing member 18 is held in position by three fastening members 30, the shanks of which are removably mounted in screw threaded openings in the sealing member 18. The heads of the fastening members 30 overlie the flange 21, but the sealing member 18 and collar 17 are freely rotatable with respect to each other except for the frictional engagement between the heads of the fastening members 30 and the flange 21.

The top of the sealing member 18 is provided with a vertically directed wall 22 which is equal in thickness to the top flange 21 of the collar 17, so that the top of the sealing member 18 is flush with the top of the flange 21. The sealing member 18 has a horizontally directed portion 23 which extends from the bottom of the wall 22 to the periphery of the sealing member 18 and which slidably fits directly beneath the flange 21. A second vertically directed wall 24 extends downwardly from the outer edge of the horizontally directed portion 23. The wall 24 is substantially equal in thickness to the unthreaded upper portion of the inside of the collar 17.

Extending downwardly from the lower edge of the wall 24 is an upper angular wall 25, which preferably extends at an angle of approximately 30° with respect to the adjacent vertical wall 24. Adjacent the lower edge of the upper angular wall 25 is an inwardly directed groove 26, beneath which is a lower angular wall 32, which preferably extends at substantially the same angle as the upper angular wall 25.

The groove 26 has a substantially square cross section. Its side walls 27 and 28 extend parallel to each other and at right angles to the angular walls 25 and 32 and to the bottom wall 29. The bottom wall 29 extends substantially parallel to the angular walls 25 and 32.

Mounted within the groove 26 is a resilient O-ring 31, which has a normally circular cross section. The O-ring is dimensioned so that its major portion is disposed within the groove 26, with an outer portion of its radius protruding therefrom substantially beyond the adjacent angular walls 25 and 32.

In use, the lid is mounted on the neck 11 of the container 10 and rotated to engage the threads 20 of the collar 17 with the threads 12 of the neck 11. The sealing member 18 and collar 17 rotate together until they have moved downardly on the neck 11 a sufficient distance for the portion of the O-ring 31 which protrudes from the groove 26 to engage the band 13 on the inside of the neck of the container 11. The frictional engagement between O-ring 31 and band 13 will then act to prevent further rotation of the sealing member 18, which will remain stationary while the collar 17 continues to rotate and continues to move downwardly along the neck 11.

The continued downward movement of the collar 17 acts to increase the pressure upon the resilient O-ring 31. When the collar 17 has been completely tightened on the neck 11, the O-ring 31 is deformed so that the portion thereof which protrudes from the groove 26 is flattened against the band 13 to provide sealing engagement for a substantial portion of the diameter of the O-ring 31.

It should be noted that if pressure exists within the container 10, which occurs when the contents are removed and replaced by carbon dioxide or other gas, such pressure will act on the adjacent side of the protruding portion of the O-ring 31 and thus tend to deform it into further sealing engagement with the band 13. The pressure within the container 10 to the extent that it urges the protruding portion of the O-ring 31 outwardly acts to urge the O-ring 31 into the space between the upper angular wall 25 and the band 13 and thus further prevents the escape of gas or pressure from the container 10.

In order to remove the lid from the container 10, it is necessary to first disconnect the gas inlet supply from the inlet plug 14, since it has been found that pressure from within the container 10 will act to maintain the seal and prevent rotation of the sealing member 18. The collar 17 can then be rotated manually in a counterclockwise direction. After the collar 17 has moved part way up along the neck 11, its top flange 21 engages the heads of the fastening members 30 and the sealing member 18 will be rotated along with the collar 17. Continued rotation of the collar 17 and sealing member 18 results in removal of the lid from the container.

We claim:

1. A pressure container having a circular neck, said neck having external screw threading at the top thereof, said neck having at the upper inside edge thereof adjacent the top of said screw threading an annular band extending at an angle of approximately 30° from vertical, a sealing lid adapted to be removably mounted on said neck, said lid comprising a collar having an annular vertically directed side wall and a horizontally directed circular flange, the center of said collar within said flange being open, said side wall having internal screw threading engageable with the external screw threading of said neck, a substantially rigid circular plastic sealing member mounted within the open center of said collar, a plurality of fastening members having their shanks screw threadedly mounted adjacent the periphery of said sealing member with their heads overlying the top flange of said collar, so that said sealing member is inseparable from said collar but is freely rotatable with respect to said collar, the lower peripheral edge of said sealing member having an inclined wall extending at an angle of approximately 30° from vertical, a groove of substantially square cross section extending inwardly at substantially a right angle from said inclined wall, a resilient O-ring of circular cross section mounted within said groove, the diameter of said O-ring being greater than the depth of said groove so that a portion of said O-ring protrudes outwardly beyond said inclined wall, said lid adapted to be tightened on said neck by rotating said collar and sealing member to move the inclined wall of said sealing member into a position adjacent to said band and bring the protruding portion of said O-ring into engagement with said band, the frictional engagement between said O-ring and band preventing continued rotation of said sealing member, the continued rotation of said collar causing increased downward pressure on said sealing member and O-ring to compress the protruding portion of said O-ring against said band for a substantial portion of the circumference of said O-ring to provide pressure-resistant sealing engagement between said lid and the neck of said container.

2. A pressure container having an externally screw threaded circular neck, said neck having at the upper inside edge thereof an annular band extending at an inwardly inclined angle, a sealing lid having internal screw threading engageable with the external screw threading of said neck, the center of said lid being open, a circular sealing member mounted within the open center of said lid, fastening means securing said sealing member to said lid so that said sealing member is inseparable from said lid but is freely rotatable with respect to said lid, the lower peripheral edge of said sealing member having an inclined wall extending at substantially the same angle as said band, a groove extending inwardly from said inclined wall, a resilient O-ring of circular cross section mounted within said groove, the diameter of said O-ring being greater than the depth of said groove so that a portion of said O-ring protrudes outwardly beyond said inclined wall, said lid adapted to be tightened on said neck by rotation of said lid and sealing member to move the inclined wall of said sealing member into a position adjacent to said band and bring the protruding portion of said O-ring into engagement with said band, the frictional engagement between said O-ring and band preventing continued rotation of said sealing member, the continued rotation of said lid causing increased downward pressure on said sealing member and O-ring to deform the protruding portion of said O-ring from a circular contour toward a substantially flat contour, in which the protruding portion of said O-ring is flattened tightly against said band to provide a pressure tight sealing engagement between said lid and container.

3. A pressure container having an externally screw threaded circular neck, said neck having at the upper inside edge thereof an annular band extending at an inwardly inclined angle, a sealing lid having internal screw threading engageable with the external screw threading of said neck, a circular sealing member mounted within said lid, fastening means securing said sealing member to said lid so that said sealing member is inseparable from said lid but is freely rotatable with respect to said lid, the lower peripheral edge of said sealing member having an inclined wall extending at substantially the same angle as said band, a groove extending inwardly from said inclined wall, a resilient O-ring of circular cross section mounted within said groove, the diameter of said O-ring being greater than the depth of said groove so that a portion of said O-ring protrudes outwardly beyond said inclined wall, said lid adapted to be tightened on said neck by rotation of said lid and sealing member to move the inclined wall of said sealing member into a position adjacent to said band and bring the protruding portion of said O-ring into engagemnt with said band, the continued rotation of said lid causing increased downward pressure on said sealing member and O-ring to deform the protruding portion of said O-ring from a circular contour toward a substantially flat contour, in which the protruding portion of said O-ring is flattened tightly against said band to provide a pressure tight sealing engagement between said lid and container.

4. The structure described in claim 3, said container being formed of translucent molded plastic material, whereby the level of syrup within said container is visible from the exterior of said container without removing said lid.

5. The structure described in claim 4, said container being formed of non-rigid material, whereby said container is breakage-resistant.

6. A pressure container having a circular neck, said neck having external screw threading at the top thereof, said neck having at the upper inside edge thereof adjacent the top of said screw threading an annular band extending at an angle, a sealing lid adapted to be removably mounted on said neck, said lid comprising a collar having an annular vertically directed side wall and a horizontally directed circular flange, the center of said collar within said flange being open, said side wall having internal screw threading engageable with the external screw threading of said neck, a substantially rigid circular sealing member mounted within the open center of said collar, said sealing member being inseparable from said collar but freely rotatable with respect to said collar, the lower peripheral edge of said sealing member having an inclined wall extending at an angle corresponding to the angle of said annular band, a groove of substantially square cross section extending inwardly at substantially a right angle from said inclined wall, a resilient O-ring of circular cross section mounted within said groove, the diameter of said O-ring being greater than the depth of said groove so that a portion of said O-ring protrudes outwardly beyond said inclined wall, said lid adapted to be tightened on said neck by rotating said collar and sealing member to move the inclined wall of said sealing member into a position adjacent to said band and bring the protruding portion of said O-ring into engagement with said band, the frictional engagement between said O-ring and band preventing continued rotation of said sealing member, the continued rotation of said collar causing increased downward pressure on said sealing member and O-ring to compress the protruding portion of said O-ring against said band for a substantial portion of the circumference of said O-ring to provide pressure-resistant sealing engagement between said lid and the neck of said container.

References Cited in the file of this patent

UNITED STATES PATENTS

| | | |
|---|---|---|
| 2,332,459 | Muney et al. | Oct. 19, 1943 |
| 2,383,747 | Sharp | Aug. 28, 1945 |
| 2,769,566 | Thompson | Nov. 6, 1956 |
| 2,831,596 | Eyles | Apr. 22, 1958 |
| 2,893,590 | Buckley | July 7, 1959 |
| 2,950,838 | Price | Aug. 30, 1960 |